United States Patent [19]

Adams

[11] 4,356,831
[45] Nov. 2, 1982

[54] BICYCLE COVER WITH LOCK HOLES

[76] Inventor: Laura A. Adams, 7101 East Kilmer St., Landover, Md. 20785

[21] Appl. No.: 205,983

[22] Filed: Nov. 12, 1980

[51] Int. Cl.³ .............................................. B62J 17/08
[52] U.S. Cl. ...................................... 135/7; 150/52 K
[58] Field of Search ............................... 135/7, 6, 5 A; 150/52 R, 52 K; 224/42.03 B, 42.03 A; 296/78.1, 78, 136

[56] References Cited

U.S. PATENT DOCUMENTS

| 3,820,651 | 6/1974 | Levy | 150/52 R |
| 3,884,523 | 5/1975 | Allen | 135/7 |
| 3,968,913 | 7/1976 | Weed et al. | 150/521 C |

FOREIGN PATENT DOCUMENTS

| 598537 | 11/1933 | Fed. Rep. of Germany | 135/7 |
| 950059 | 9/1956 | Fed. Rep. of Germany | 150/52 K |
| 471696 | 6/1914 | France | 150/52 K |
| 1034045 | 3/1951 | France | 150/52 K |
| 88116 | 8/1956 | Sweden | 150/52 K |
| 480382 | 2/1938 | United Kingdom | 135/7 |

Primary Examiner—Richard C. Pinkham
Assistant Examiner—T. Brown
Attorney, Agent, or Firm—LeBlanc, Nolan, Shur & Nies

[57] ABSTRACT

A protective cover for bicycles, and other wheeled vehicles is described. The cover is of a collapsible, weatherproof materials such as a heavy gauge plastic which may be stored in a compact roll. The cover consists of a generally U-shaped, in vertical cross-section, envelope intended to fit over the bicycle with an upper drawstring surrounding the seat and handlebars and a lower drawstring surrounding the lower portions of the wheels. Two pairs of reinforced holes are provided in either side of the cover adjacent inner portions of the wheels so that a conventional bicycle lock may be used to secure the bicycle and to secure the cover thereto.

6 Claims, 2 Drawing Figures

BICYCLE COVER WITH LOCK HOLES

This invention relates to a weatherproof cover for wheeled vehicles such as bicycles. The cover of this invention also, as will be obvious to those skilled in the art, may be modified to accomodate other wheeled vehicles such as mopeds, tricycles, and the like. The cover of this invention not only provides a secure, weatherproof, protective envelope for the vehicle, but is provided with two pairs of reinforced openings so that a conventional chain or cable bicycle lock may be used to secure the bicycle against theft and simultaneously secure the cover to the bicycle.

In many homes, adequate indoor storage space to accomodate bicycles is not available. It is often not feasible to bring the vehicle into the home because of its size, and protected or secure storage space outside the home is not available. Accordingly, there is a need for a means for protecting bicycles from the weather for storage outdoors which also will accomodate a means for securing the vehicle against theft.

The prior art describes a variety of covers to protect wheeled vehicles such as motorcycles from the weather. For example, in British Pat. No. 480,382 dated Feb. 22, 1938, such a cover is described which fits over a motorcycle and is secured by elastic straps extending underneath the vehicle. In German Pat. No. 806,642 dated June 14, 1951, a similar cover for a motorcycle is described with a hasp-type lock carried by the cover which will accomodate a padlock. The cover further includes a base however, and is clearly not portable In German Pat. No. 950,059 dated Oct. 4, 1956, a similar motorcycle cover without the base is described. However, this cover utilizes diagonal drawstrings to tighten the cover about the motorcycle and therefore is not susceptible to locking. Finally, in Norwegian Pat. No. 88,116 dated Aug. 4, 1956, a collapsible cover is described which will cover a bicycle and maybe collapse into a carrying case mounted on the cover. This cover also does not provide for securing the cover about the bicycle, or locking the cover to the bicycle.

In contrast, the cover of the instant invention provides upper and lower drawstrings for securing the cover about the bicycle and, in addition, provides two sets of reinforced holes disposed adjacent the wheels thereof for accomodating a conventional chain or cable bicycle lock. The cover of this invention then will protect the bicycle from inclement weather and, in combination with a conventional bicycle lock, maybe secured to the bicycle, and the bicycle, in turn, secured against theft.

Accordingly, it is an object of this invention to provide a portable weatherproof protective structure for a bicycle or similar vehicle.

It is another object of this invention to provide a collapsible cover for a bicycle which will facilitate use of a conventional bicycle lock.

It is still another object of this invention to provide a weatherproof, collapsible cover for a bicycle which may be secured about the handlebars and about the tires and which has reinforced openings to receive a conventional chain lock so that the cover may be secured to the bicycle, and the covered bicycle secured to an immovable object.

It is yet another object of this invention to provide a secure, weatherproof, protective structure for a bicycle, tricycle, moped, or the like which, when not in use, may be collapsed into a convenient carrying bag, and which is adapted to cover the bicycle or other vehicle and fit snugly therearound, and provide access openings so that a conventional chain or cable lock may be passed through the cover, through the bicycle wheels disposed thereinside, and around an immovable object such as a tree or light post so that the bicycle and cover will be protected against theft.

These and other objects will become readily apparent with reference to the drawings and following description wherein.

Figure 1:
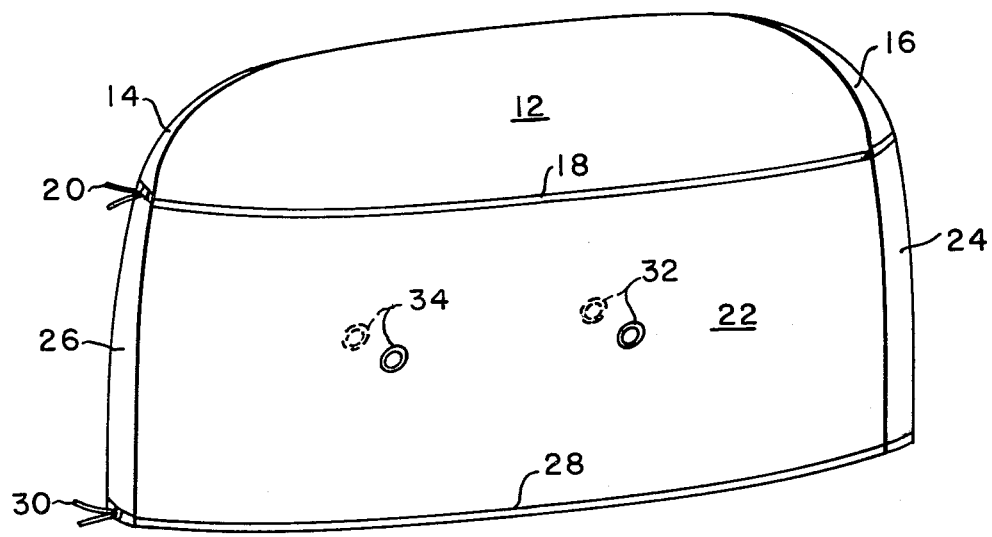
FIG. 1 is a perspective view of the cover of this invention.

With attention to the drawings, and to FIG. 1 in particular, the cover of this invention 10 includes an upper section 12 shaped in the form of one half of a pear. Specifically, the forward section 14, as shown more precisely in FIG. 2, has a greater horizontal width and is rounded to receive the handlebars. The rear section 16 has a narrower rounded horizontal thickness to receive the bicycle seat. Upper portion 12 is bordered by a loop of fabric 18 which preferably contains a conventional drawstring 20. With attention to FIG. 2, drawstring 20 is intended to be drawn tightly around the handlebars and seat portion of the bicycle to provide a snug fit. Vertical sides 22 extend downwardly from the loop of fabric or material 18 and are adapted to cover both sides of the bicycle. A narrow rear skirt portion 24 is preferably provided to receive the rear portion of the rear tire. Similarly, a narrow skirt portion 26 is provided adjacent the front portion 14 to receive the front portion of the bicycle tire.

The distal portion of sides 22, 24 and 26 terminates in a second loop of fabric or material 28 which contains a lower drawstring 30. Drawstring 30 is intended to be used to provide a snug fit around a lower portion of the bicycle wheels as shown in FIG. 2.

Figure 2:
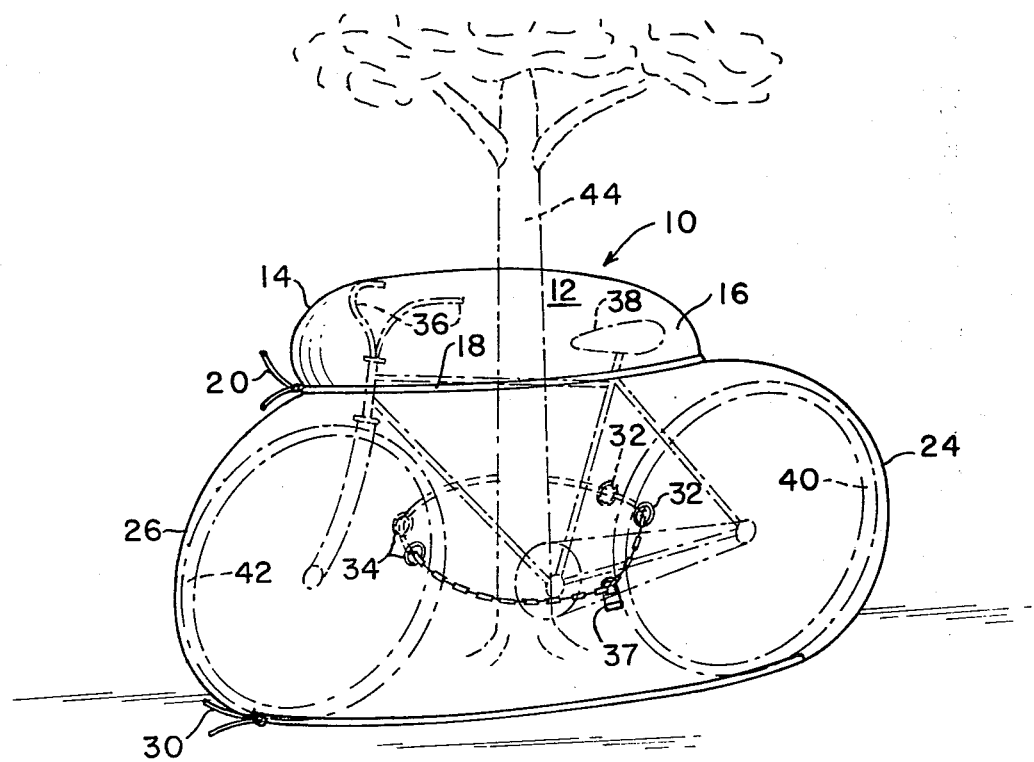
FIG. 2 is a perspective view of the cover of this invention covering a conventional bicycle shown in phantom and attached to a tree, also shown in phantom.

With reference to FIGS. 1 and 2 the cover of this invention 10 provides two pairs of reinforced openings 32 and 34. The openings are surrounded either by an extra thickness of the material, or by a metal gromet as desired. The openings 32 and 34 are sufficiently large to receive a conventional chain or cable bicycle lock 36 as shown in FIG. 2.

With attention to FIG. 2, the device of this invention 10 is utilized as shown to cover the bicycle shown in phantom. The handlebars 36 are received in the forward portion 14 and the seat 38 is received in the rear portion 16 of the top 12. Sides 22 cover the sides of the bicycle and the rear portion 24 of cover 10 receives the rear wheel 40 and the forward portion 26 receives the front wheel 42. A convention chain or cable lock secured by a padlock or other conventional lock then extends through holes 32 capturing rear wheel 40 therebetween, and through holes 34 capturing the front wheel 42 therebetween. The lock 37 also preferably surrounds an immovable object such as the tree of 44 shown, or another similar object as will be obvious to those skilled in the art.

When it is desired to use the bicycle, the lock 37 is removed from holes 32 and 34. Drawstrings 30 and 20 are then loosened and the cover 10 lifted upwardly over the bicycle. Cover 10 is preferably constructed of heavy gauge plastic, or other collapsible weatherproof material. Therefore when not in use it may be collapsed into a convenient carrying case (not shown) and attached to the bicycle as a seat-mounted saddle bag as is well-known in the art. The drawstrings 20 and 30 may be used either to secure the collapsed package of cover 10 if, for example, it is desired to roll the cover in the fashion of a sleeping bag roll.

As will be obvious to those skilled in the art, this invention may be adapted to use with any conventional type of wheeled vehicle, such as a tricycle or moped or the like. In which case the dimensions will be altered accordingly. The cover is also intended to be adapted to any conventional type of bicycle lock intended to capture the wheels thereof, or a single wheel and secure the same to a post, tree, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes will come within the meaning and range of equivalency of the claims are therefore intended to be embraced therein.

What is claimed and desired to be secured by Letters Patent is:

1. A non rigid, protective covering for a bicycle or similar wheeled vehicle having a frame, a front wheel rotatably mounted thereon, at least one rear wheel rotatably mounted thereon, a seat mounted on the upper portion of the frame and handle bars mounted on the frame and operably coupled to the front wheel, said covering comprising:

an upper portion adapted to cover the upper portion of the vehicle including the handle bars and seat, said upper portion being substantially pear-shaped in longitudinal cross section with a maximum horizontal thickness in a front portion for receiving the handle bars and a minimum horizontal thickness in a rear portion for receiving the seat, front, said and rear panels integrally depending from said upper portion with adjacent vertical edges thereof joined to form a continuous covering for the vehicle; first drawstring means carried by said covering and surrounding the juncture between said upper portion and said side panels for drawing said covering about the seat and handle bars of the vehicle when the vehicle is covered by said covering; second drawstrings carried by said panels at the edge thereof opposite the juncture with said upper portion for drawing said panels about the wheels of the vehicle when the vehicle is covered by said covering so that said covering will cover substantially all of the vehicle; and means carried by said covering for receiving a lock whereby said covering may be locked to the vehicle and the vehicle and cover locked to an external immovable object.

2. The covering of claim 1 wherein said upper portion and front, rear and side panels are contructed of a heavy gauge weatherproof material.

3. The covering of claim 2 wherein said first drawstrings means includes a circumferential loop of said material formed at juncture of the front, rear, and side panels and said upper portion and a drawstring received in said loop.

4. The covering of claim 3 wherein said second drawstring means includes a circumferential loop of said material formed at the distal depending edge of said panels and a drawstring received in said loop.

5. The covering of claim 4 wherein said means for receiving a lock comprises a pair of mutually spaced reinforced openings formed in each of said side panels with opposite openings in registration with each other so that a chain or cable may pass through opposite openings and capture a wheel of the vehicle.

6. The covering of claim 5 wherein said material is plastic.

* * * * *